United States Patent [19]

Lam et al.

[11] Patent Number: 5,436,840
[45] Date of Patent: Jul. 25, 1995

[54] VEHICLE POSITION UNCERTAINTY AREA CORRECTION METHOD AND APPARATUS THEREFOR

[75] Inventors: Stella Lam, Buffalo Grove; Elisha M. Kozikaro, Chicago; Clyde B. Harris, Wheeling, all of Ill.

[73] Assignee: Motorola, Inc., Schaumburg, Ill.

[21] Appl. No.: 26,722

[22] Filed: Mar. 5, 1993

[51] Int. Cl.⁶ ............................................. G06F 165/00
[52] U.S. Cl. .................... 364/449; 364/443; 342/457; 340/988; 340/995
[58] Field of Search ............... 364/443, 444, 449, 460, 364/461, 436, 437, 439; 73/178 R; 340/988, 990, 995; 342/450, 451, 455, 456, 457

[56] References Cited

U.S. PATENT DOCUMENTS

| | | | |
|---|---|---|---|
| 4,774,672 | 9/1988 | Tsunoda et al. | 364/444 |
| 4,796,191 | 1/1989 | Honey et al. | 364/449 |
| 4,999,783 | 3/1991 | Tenmoku et al. | 364/449 |
| 5,307,278 | 4/1994 | Hermans et al. | 364/443 |

Primary Examiner—Gary Chin
Attorney, Agent, or Firm—Nicholas C. Hopman

[57] ABSTRACT

In a preferred embodiment, a vehicle position uncertainty area correction method and a corresponding apparatus are detailed. This method is preferably executed on a hardware platform 400. This method includes provision of an initial position envelope (307) associated with a vehicle position. Then, a corrected position envelope (307'''') is derived from the initial position envelope (307) and bounded within a predetermined fixed area (313, 315) surrounding an outermost pair (305, 309) of road segments. The outermost pair (305, 309) of road segments are extracted from a map database (415) positioned within boundaries delimited by the position envelope (307).

23 Claims, 5 Drawing Sheets

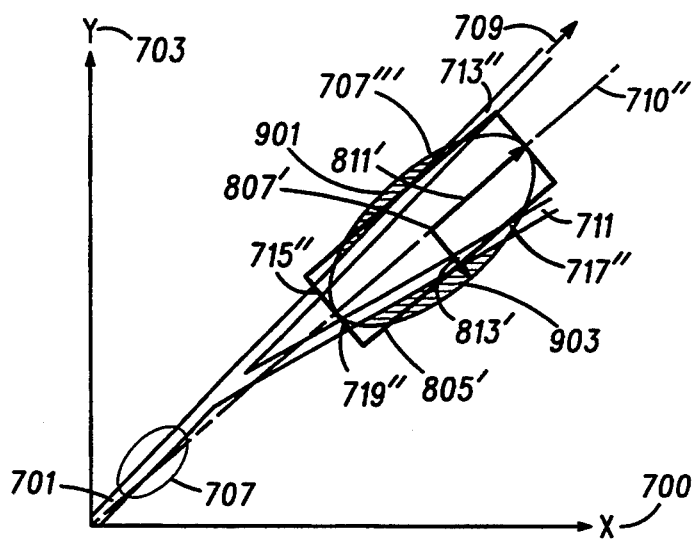
FIG. 9
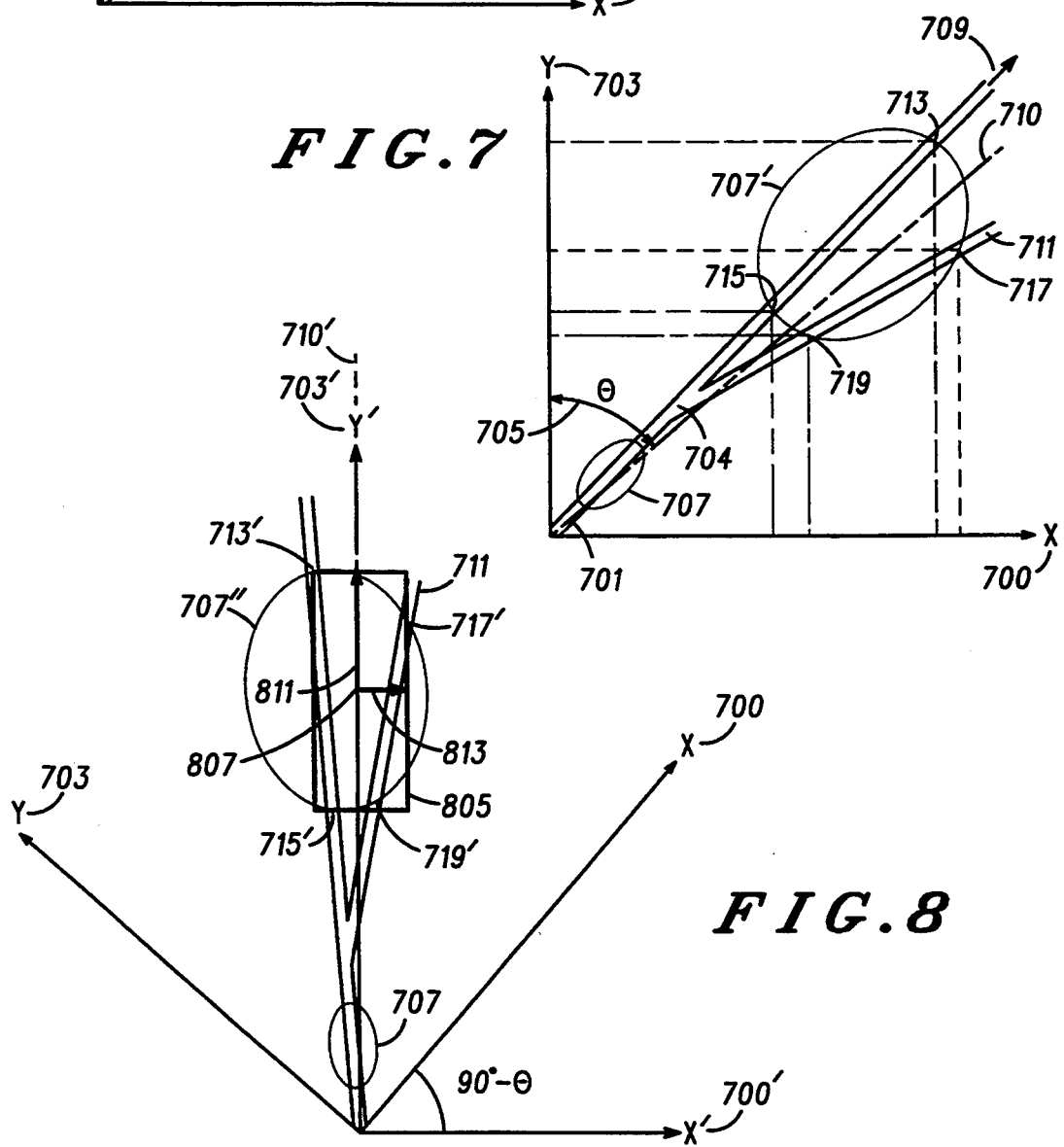
FIG. 7
FIG. 8

VEHICLE POSITION UNCERTAINTY AREA CORRECTION METHOD AND APPARATUS THEREFOR

FIELD OF THE INVENTION

This invention is generally directed to the field of vehicle navigation and more particularly to a method of correcting a position uncertainty area surrounding a navigable vehicle.

BACKGROUND OF THE INVENTION

Various methods and systems for vehicular navigation are well known. Particularly, many vehicle navigation systems rely on sensors to determine where a vehicle is positioned within an area of navigability. These systems typically employ a well understood technique known as dead-reckoning. Dead-reckoning is used to track the relative position of a vehicle with regard to another position, such as an origin. Typically, distance traversed and azimuth, or heading, are used to determine incremental changes in vehicular position with respect to the origin. These sensory systems inherently have error associated with their operation. A portion of this error is cumulative. This cumulative error detracts from the accuracy of the dead-reckoning navigation process. As a result of this inaccuracy, the actual vehicle position will not agree with the dead-reckoning vehicle position. This inaccuracy will likely increase, or continue to accumulate with additional distance traversed, thereby increasing the dead-reckoning error, or increasing the vehicle position uncertainty.

Several prior art systems have improved the accuracy of these dead-reckoning systems by matching the dead-reckoning position to a position associated with a location on a map. This is commonly known as map-matching. When the dead-reckoning behavior indicates that the vehicle is on the map, the dead-reckoning position may be adjusted to an absolute position, relative to this map thereby eliminating the cumulative error until the next map-matching step.

FIG. 1 illustrates the result of one of the simple, well known, map-matching techniques. A vehicle 101 starts at a known position 103 on a road segment 105. A dead-reckoning positioning system, associated with the vehicle 101, is initialized to that known position 103. A position reference is used to establish this known initial position 103, and typically may be a map or other absolute reference apparatus. This initialization step has an inherent inaccuracy, or uncertainty, bound by a position envelope, represented by reference number 107. This uncertainty may include the inaccuracy of the map, or other position reference, and a width of the road segment 105. The width of the road segment 105 is included because the vehicle 101 may be anywhere on the road segment 105. Of course, this particular position envelope 107 is one of many approximations of the actual geometry of the area of position uncertainty associated with the initial position reference. Here, an ellipse is used for convenience because it is a simple and often used representation of position envelopes.

When the vehicle 101 traverses, either off-road, or along the road segment 105, this position envelope 107 will increase in area, or uncertainty, as shown by reference number 107′. This increase in uncertainty is directly related to the cumulative sensor error described earlier. As a result, the dead-reckoning vehicle position may drift off of the mapped road segment as shown by reference number 101′. Reference number 109 shows the length of the position envelope 107′, and reference number 111 shows the width of the position envelope 107′. Both the-length 109 and the width 111, and the orientation of these, will be a function of the initial uncertainty and the accumulated uncertainty that results from the vehicle sensor inaccuracies.

As the dead-reckoning position diverges too far from the position associated with the road segment 105, prior art systems will correct the dead-reckoning system by aligning per se. its position envelope 107′ to the mapped road segment 105. If the vehicle 101 is traversing, without turning, on a singular road segment, the width, or position, uncertainty, generally resulting from heading associated with reference number 111 can be corrected by this action. If the vehicle turns then the length, or distance, uncertainty associated with reference number 109 can be corrected by associating the turn with a map topology. Corresponding to the same turn, the width, or heading uncertainty, may also be corrected. For a singular road segment a width, or heading, correction map-matching step is shown by reference numbers 101″, 103′, and 107″ respectively. For clarity this is shown after a distance has been traversed along the road segment 105. In practice this uncertainty correction, or map-matching, is done at about one second intervals, and therefore the vehicle 101″ is actually positioned more relatively dose to the vehicle 101′. Although this type of map-matching, for correcting position uncertainty, can be effective for this simple case, there are many types of road segment topologies that this simple scheme can be rendered hopelessly ineffective.

FIG. 2 shows a simple case of such a road segment topology. In this case a road segment 205 commences as a singular road segment, then road segment 209 diverges from road segment 205. Prior art map-matching schemes may consider this subtle branching of road segments as a singular road segment if the position envelope at least partially encompasses both road segments 205 and 209, due to a relatively large position uncertainty. In this case, the vehicle position is ambiguous because the road segment 205, 209 positions are ambiguous relative to the position envelope 207′. When this situation occurs, in prior art schemes, no map-matching update, or correction of cumulative position uncertainty is made in fear of making the wrong correction, thereby matching the vehicle 201 to the wrong road segment. While the vehicle 201 continues along this ambiguous set of road segments 205, 209 the sensor error will continue to accumulate and the uncertainty portion of the position envelope will continue to grow unbounded. Because of this, the vehicle may get lost as the position envelope accumulates to such a degree that it encompasses many road segments, making map matching unlikely from a practical and timely perspective.

Referring back to FIG. 2, it's easy to see the position envelope 207″ growing unbounded, thereby getting out of control.

What is needed is an improved accuracy vehicle positioning method for optimizing the position envelope's size, corresponding to an increasing degree of uncertainty caused by sensors associated with a vehicle navigation system while an ambiguous road segment topology is present.

BRIEF DESCRIPTION OF THE DRAWINGS

FIG. 7 is a diagram used to describe a position envelope correction process as described in the preferred embodiment;

FIG. 8 is another diagram used to describe a position envelope correction process as described in the preferred embodiment; and FIG. 9 is another diagram used to describe a position envelope correction process as described in the preferred embodiment.

DETAILED DESCRIPTION OF A PREFERRED EMBODIMENT

In a preferred embodiment a vehicle position, uncertainty area, correction method is detailed. This method includes provision of an initial position envelope associated with a vehicle position. This initial position envelope varies in size responsive to error associated with a sensory system's response to a variable vehicle position. Then, a corrected position envelope is derived from the initial position envelope, and is bounded within a predetermined fixed area surrounding an outermost pair of probable road segments, thereby providing a corrected position envelope and optimizing its area.

Figure 1:
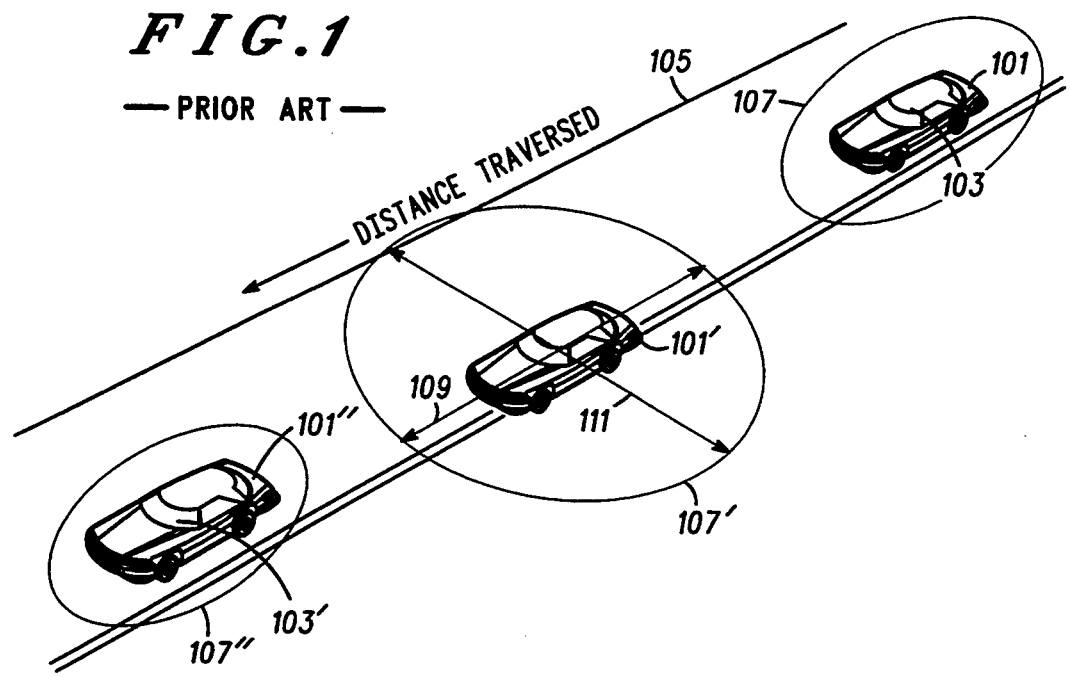
FIG. 1 is a diagram illustrative of a prior art map-matching operation.

FIG. 1 illustrates one of the simple, well known, map-matching techniques for managing growth of a position envelope, due to uncertainty attributable to a cumulative error associated with vehicle sensors, and is described in the Background of the Invention section of this application.

Figure 2:
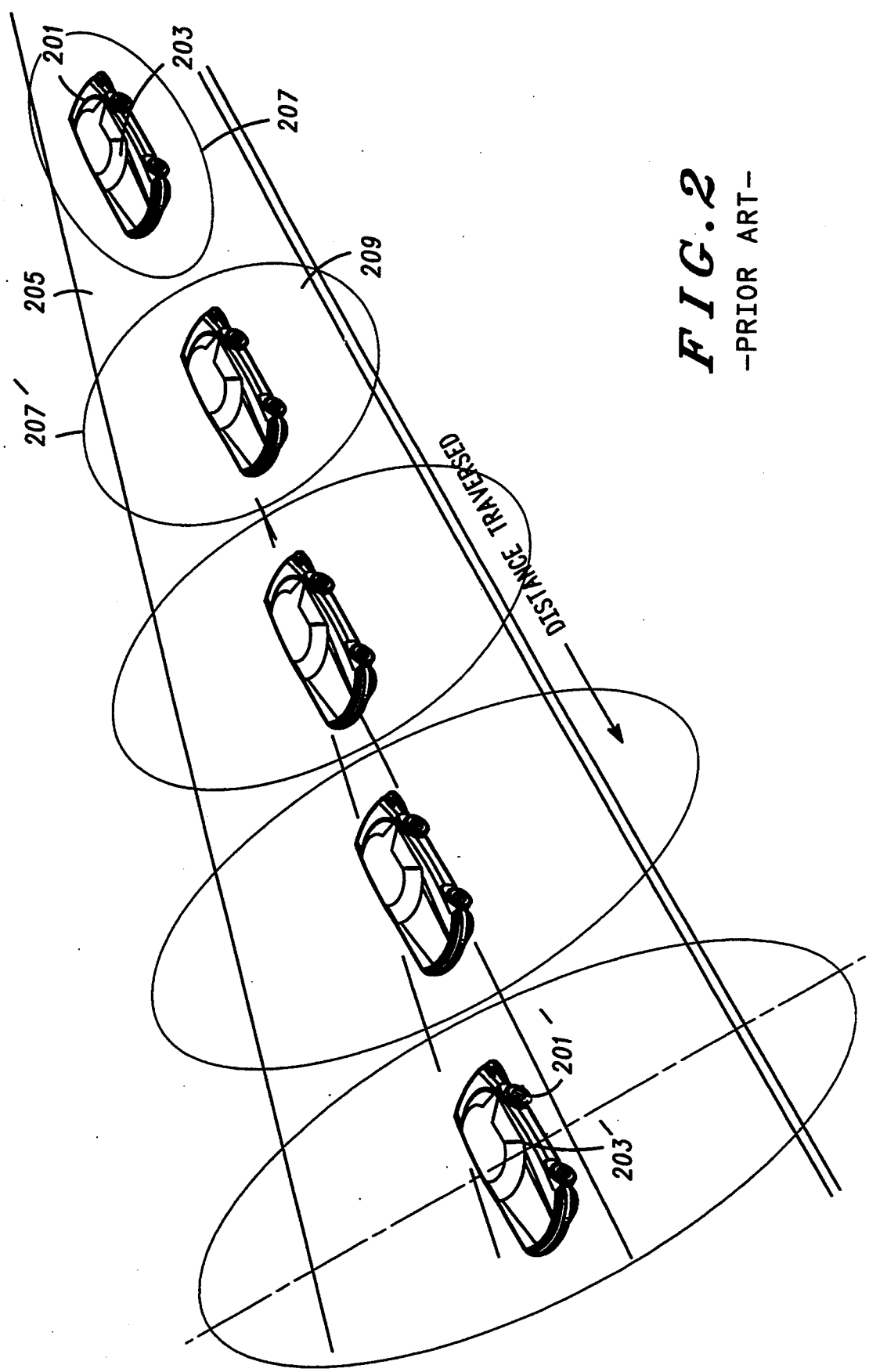
FIG. 2 is a diagram showing a vehicle position envelope that grows to encompass more than one distinct road segment, and is illustrative of a deficiency of prior art map-matching system operation.

FIG. 2 is a diagram showing a vehicle position envelope 207" that grows to encompass more than one distinct road segment, thereby leading to an ambiguous vehicle position as understood by a navigation system. In this case, prior art map-matching associated with the navigation system is ineffective in managing this growth of the position envelope 207", due to uncertainty attributable to a cumulative error associated with vehicle sensors. FIG. 2 is described in the Background of the Invention section of this application.

Figure 3:
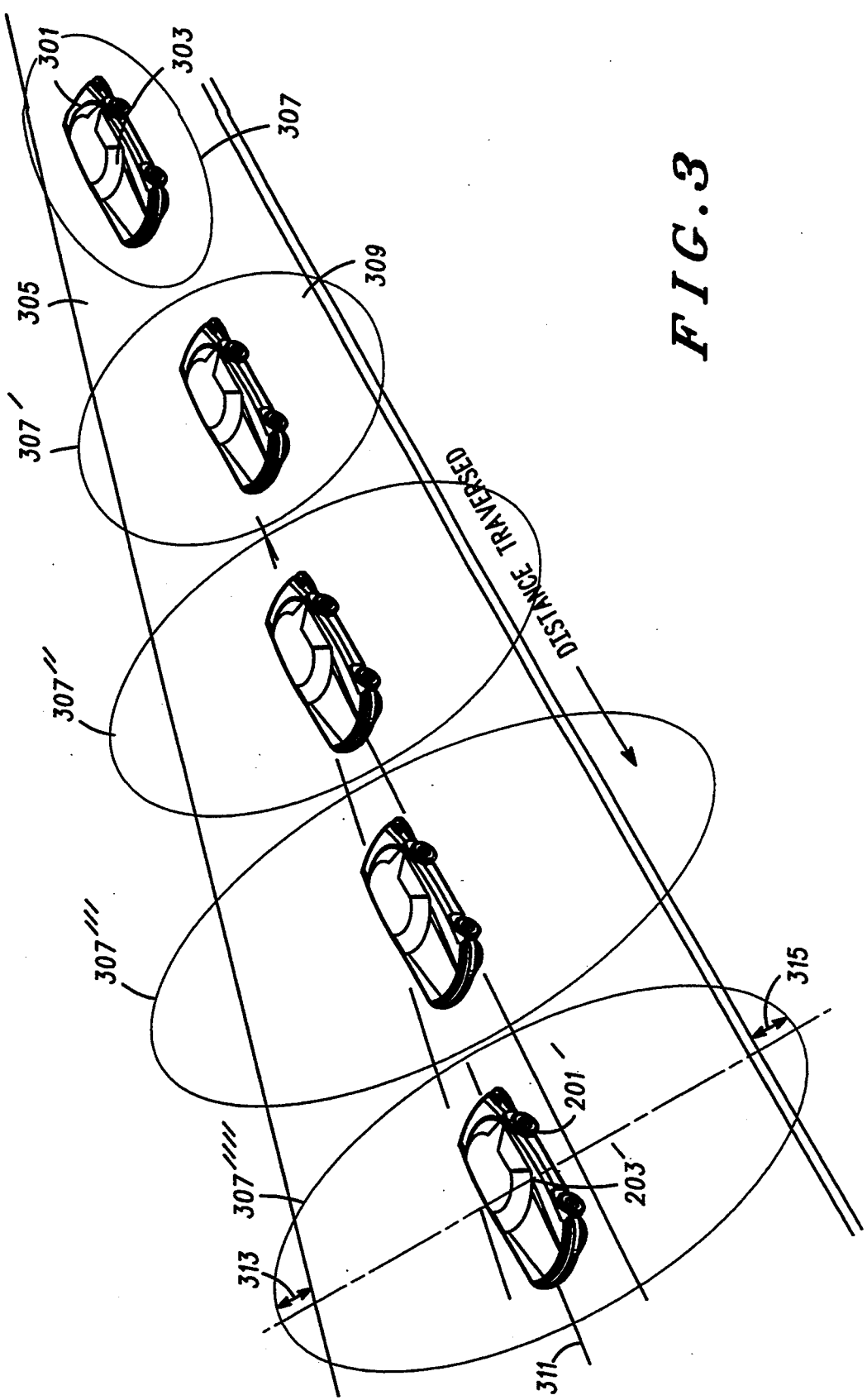
FIG. 3 is a diagram showing a vehicle position envelope that grows to encompass more than one distinct road segment, and a corrected vehicle position envelope as described in a preferred embodiment.

FIG. 3 is used as an aid in describing a new method, and apparatus, corresponding to the preferred embodiment. Specifically, in FIG. 3 a vehicle 301 is positioned 303 on a road segment 305 within an initial position envelope 307. The boundaries of this initial position envelope 307 are determined, in part, by a position uncertainty inherent in a position reference that is used to assign this initial position envelope. This position reference may be a map, a GPS receiver, or any other absolute positioning means or method. Also, the boundaries of this initial position envelope 307 are determined, by the road segment 305 width because the vehicle 301 may be positioned anywhere on the road segment 305. As the vehicle 301 traverses, the position envelope 307 will grow, as shown by reference numbers 307', 307", and 307'" respectively. As mentioned earlier, this growth in size of the position envelope 307 is related to an uncertainty attributable to a cumulative error associated with vehicle sensors used to determine position.

As the position envelope progressively grows in area from 307 to 307'", it includes the initial road segment 305 then also another connected and diverging road segment 309. When the position envelope grows to include both road segments 305 and 309, as shown in FIG. 3, the position of the vehicle 301 will be ambiguous with respect to which road segment it's on. This growth in the area encompassed by the position envelope 307, 307', 307", and 307'" is caused by the inherent growth in, or accumulation of, error associated with the vehicle's dead-reckoning system sensors. This growth, or unbounded expansion of the position envelope 307 to 307'", is typical of prior art systems when faced with an ambiguity in the locally positioned road segments, as shown in the case here.

Reference number 307"" shows a corrected position envelope, corresponding to a correction method described in this preferred embodiment. The position envelope 307"" is bounded within a predetermined fixed area outside, or surrounding, the road segments 305 and 309, as shown by reference numbers 313 and 315. The method to achieve this result will be described below. However, preceding that description, a hardware platform, or apparatus, for executing the improved correction method will be detailed.

Figure 4:
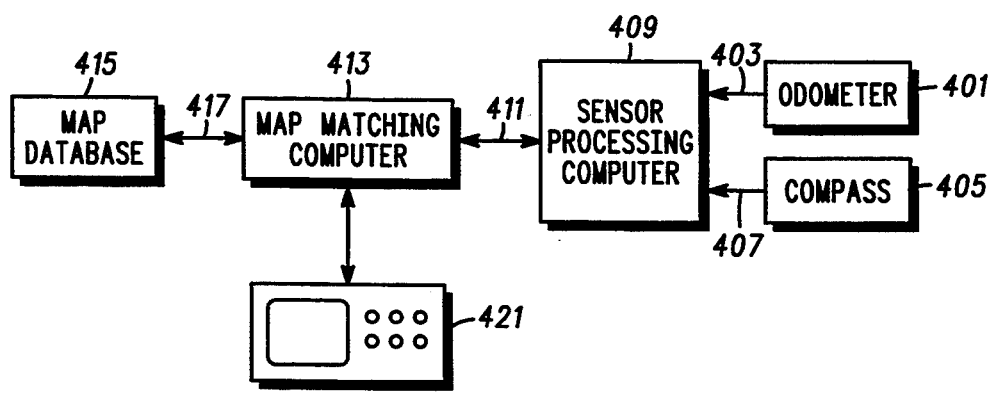
FIG. 4 is a block diagram illustrating a hardware platform used for executing various method steps, in accordance with the invention.

FIG. 4 is a block diagram illustrating a particular hardware platform, used in the preferred embodiment. This hardware platform. 400 represents a vehicular navigation system. Block 401 represents an odometer, and block 405 represents a compass. Together these sensors provide both distance traversed and heading information on interconnects shown by reference numbers 403 and 407 correspondingly, to a sensor processing computer 409. Of course, other sensory devices that provide distance traversed and heading information may be substituted for these sensors. The sensor processing computer 409, with the execution of a predetermined, well known firmware program, combines the information supplied on lines 403 and 407, to determine an incremental position for representing a dead-reckoning position 411 to a map-matching computer 413. In the preferred embodiment, the sensor processing computer includes a Motorola MC68HC11E9FN microcontroller. Those skilled in the art will recognize many other substantially equivalent sensory devices and means for fusing, or integrating the information supplied by these sensors, to determine a dead-reckoning position.

The map-matching computer 413 includes a Motorola MC68340 microcomputer. This microcomputer is programmed in accordance with firmware represented in a high level form in method steps illustrated in a flow chart shown in FIG. 5. The map-matching computer 413 includes a DMA channel interface 417 to a CDROM reader that has a digital map database 415 stored on a CDROM disk. This map database 415 provides absolute position information over the interface 417 to the map-matching computer 413. Of course, those skilled in the relevant art will recognize other absolute position reference mechanisms and methods of accessing their embodied position information. Also, there is an operator interface panel 421 connected through an RS-232 link 419 with the map-matching computer 413. Next, method steps executed on this platform will be detailed.

Figure 5:
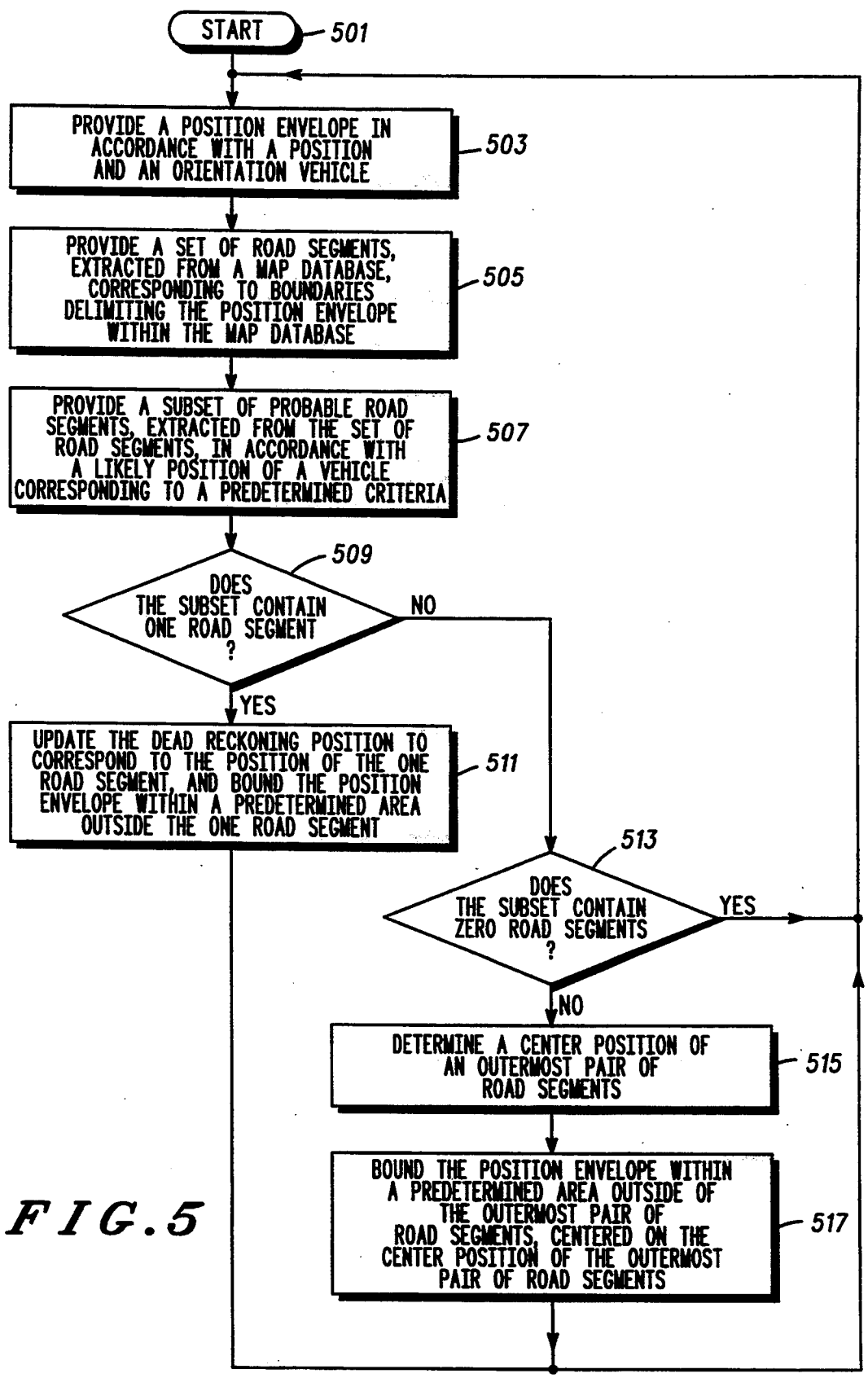
FIG. 5 is a system flow chart representing executable software for application on the hardware platform shown in FIG. 4.

FIG. 5 illustrates a flow chart representing the method steps to be coded into firmware for execution on the map-matching computer 413 shown in FIG. 4. The method steps commence at step 501.

Figure 6:
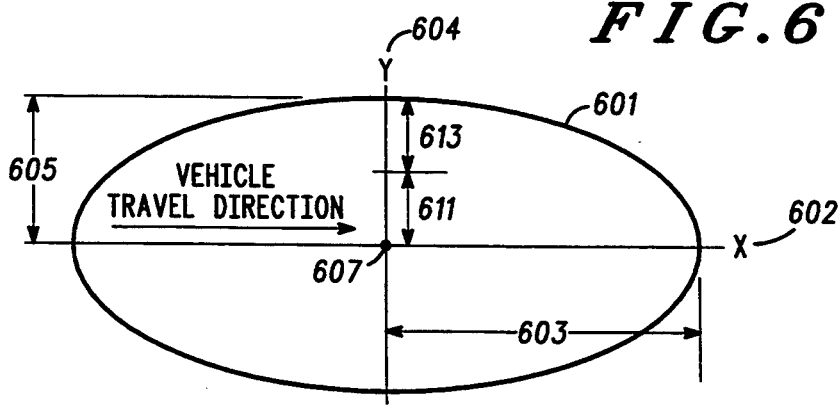
FIG. 6 is a diagram used to describe an elliptical math model referred to in the description of the preferred embodiment.

In step 503, the map-matching computer 413 starts with an initial position envelope in accordance with a dead-reckoning position and an orientation of a vehicle. The dead-reckoning position and orientation, or heading, of the vehicle is provided from the sensor processing computer 409 to the map-matching computer 413. The map matching computer 413 then constructs a map-matching position envelope based on a mathematical model. The model for this position envelope can be viewed in FIG. 6. Note that an ellipse is used here for convenience because it is a simple anti often used representation of a position envelope. Of course, those skilled in the art will recognize many other, equivalent, mathematical models that may be used to represent a position envelope. A position envelope 601 has a semi-major axis (a) 603 located along an X axis 602, and a semi-minor axis (b) 605 centered on a position 607, and located along a Y axis 604. The semi-minor axis (b) 605 represents a total uncertainty span, measured from a position 607, and its span includes at least two sources of uncertainty. The first uncertainty span is a width of a particular road segment, illustrated by reference number 611, identified from the map database 415. The second uncertainty span is illustrated by reference number 613 and is associated with an inaccuracy of the digitized map database 415. Of course there may be additional inaccuracies. These are not represented here for reasons of simplicity. Also, a semi-major axis (a) 603, represents a distance uncertainty. Drawing an ellipse surrounding these spans, 603 and 605 defines the position envelope 601.

Returning to FIG. 5, in step 505 the program provides a set, or list, of road segments extracted from the CDROM map database 415 corresponding to the position envelope's boundaries within the map database 415. These boundaries may be specified in terms of latitude and longitude. The elliptical model may be dipped into a rectangular format specifying the boundaries in terms of four sets of latitude and longitude coordinates. This makes the map database look-up operation simple. Of course other strategies may be used as well. The data extracted from the CDROM map database 415 resulting from this operation 505 includes a database record having characteristic information describing the particular road segments of interest. This information may include, but is not limited to a road segment identification number, road segment length, road segment heading, or azimuth, road segment restrictions—such as a one-way street, and road segment end point positions, which may be encoded in terms of latitude and longitude.

Next, in step 507, a subset of probable road segments is extracted, or filtered, from the set of road segments, in accordance with a likely, or probable position of a vehicle corresponding to various predetermined criteria. This step includes the filtering out, or elimination of road segments within the position envelope, via predetermined criteria, that represent unlikely positions for the vehicle. The criteria for elimination of road segments may include, but is not limited to, connectivity topology criteria, road segment heading information, and traffic flow restrictions.

The connectivity topology criteria refers to an assumption that a traversing vehicle will not change its position, from one road segment to another disconnected road segment, without going off-road first. Therefore, this filtering step would allow only connected road segments to be passed along to the subset, unless all road segments are disconnected. This condition may occur if the vehicle traverses from an off-road to an on-road position. If this case occurred, all road segments would be kept. Preferably, it is the connected road segments that are of interest to the method being described, because they represent the potential for influencing the vehicle's position ambiguity, or uncertainty, if these connected road segments are positioned within the boundary of the vehicle position envelope.

Road segment heading information is also considered when filtering the set of road segments to a subset of likely road segments. To do this all road segments that have a substantially different heading than that of the vehicle heading are filtered out, or discarded. Thus road segments that are substantially parallel within a predetermined criteria will be included in the subset of likely road segments. This criteria may be related to the sensory error. Note that the compass 405 of FIG. 4 is used to measure the current vehicle heading.

Further, certain traffic flow restrictions may be considered. For instance if the vehicle is traversing in an area with more than one probable, road segments and the position envelope is large enough to cause a position certainty ambiguity, the posted speed limit can be checked against the actual speed of the vehicle. Often highways and their corresponding frontage road segments can be considered good candidates for this filter. Also the direction of adjacent one-way streets may cause elimination of certain road segments.

Those skilled in the art will recognize other criteria for the elimination of road segments associated with unlikely positions of the vehicle.

Next, in step 509, the program determines whether or not the subset contains exactly one road segment. If the step 509 determines that exactly one road segment is in the subset, then step 511 is executed.

In step, 511, the program updates the dead-reckoning position to correspond to the position of the one road segment, and bounds the position envelope within a predetermined fixed area outside the one road segment. This predetermined fixed area is composed of the uncertainty associated with the road segment width and the map error. Typically, the road segment width error, or uncertainty, may be ±10 meters and the map error, or uncertainty, may be +15 meters. The program then returns to step 503 for re-execution. Of course, other criteria may be applied to this map-matching step to qualify its execution. For instance, it is common to wait until a certain distance is traversed, to build confidence that the vehicle is actually positioned on the singular road segment before map matching takes place.

If in step 509 the program determines that the subset does not contain only one road segment, then step 513 is executed.

In step 513 the program determines whether or not the subset contains zero road segments. If the subset does contain zero road segments then the program returns to step 503 for re-execution. If the subset contains more than one road segment then steps 515 and 517 are executed. The purpose of these steps 515 and 517 is to align, or in some cases center, the position envelope on a pair of outermost road segments, and bound the position envelope within a predetermined fixed area surrounding the outermost pair of road segments. This predetermined fixed area is typically bounded by the map uncertainty and the road segment width uncertainty. This is in order to optimize the position uncertainty area corresponding to the vehicle's position. Because of these steps, in combination with the other steps in the method, this method offers a significant advantage over the prior art map-matching schemes. While other prior art map-matching schemes would allow the position envelope to either grow unbounded, or force a selection of one or the other road segment the choice of which could be incorrect ultimately leading to a lost situation, the present method bounds this position envelope to an optimal size and allows several possibilities to exist until new information unveils a unique location. This means that the vehicle will not get lost in the situation where it's traversing on these types of ambiguous road segments, in contrast with prior art systems.

FIG. 7 is now introduced to illustrate an actual case for correcting a vehicle position envelope where the road segment topology is ambiguous. It shows a graphic illustration of road segments extracted from a portion of the map database 415, and various position envelopes associated with various positions of a vehicle located within this portion of the map database 415.

A first road segment 701 is oriented apart from a Y (north-wardly direction) axis 703 by a heading azimuth of about 45 degrees. Note that a corresponding X axis 700, perpendicular to the Y axis 703, is also provided for reference purposes. A road segment 711, diverges from road segment 701 as shown at reference number 704. An initial position envelope 707 is shown positioned on the road segment 701. Note that it is assumed that a vehicle is positioned at the center of this envelope 707, and is traversing north-east-wardly as shown by reference number 709. As the vehicle traverses the initial position envelope 707 grows to a larger position envelope as shown by reference number 707'. This expansion of the position envelope is caused by a growth in uncertainty related to the cumulative inaccuracy of the dead-reckoning sensors 401, 405. It is assumed that a map-matching correction is not done between these positions 707 and 707' on the map so that it is easier to see the method, and corresponding apparatus in action. Since, at the point on the map corresponding to the position envelope 707', the map-matching correction has not been executed, the position envelope 707' has grown unbounded to include a substantial area surrounding the two road segments 701 and 711. If left to grow, as in the case of prior art, the position envelope 707' may grow large enough to cause an increase in the frequency of ambiguous positioning situations, thereby increasing system processing loads, and eventually may cause the system to loose the true vehicle position. Note, that if a heading difference of the diverging road segment 711 is substantially different from the segment 701, then a conventional map-matching correction may be made.

Returning to FIG. 5, in step 515 the program determines a center position of the outermost pair of road segments within the subset of probable road segments. This will require a mathematical step as follows. The map-matching computer 413 executes the following equation.

$$\theta = \theta_{min} + \frac{(\theta_{max} - \theta_{min})}{2} \quad \text{EQUATION 1}$$

where:

$\theta_{max}$ = maximum road segment heading among the remaining road segments in the subset $\theta_{min}$ = minimum road segment heading among the remaining road segments in the subset Note that although FIG. 7 shows only two road segments 701 and 711, this method can handle additional road segments within the position envelope. Reference number graphically illustrates the determined center position resulting from the execution of Equation 1.

Next, in step 517, the position envelope is bound within a predetermined fixed area surrounding the outermost pair road segments centered on the center position of the outermost pair road segments, thereby providing a corrected position envelope and optimizing its area. Several mathematical steps will be executed to do this.

First, the intersection of the road segments and the position envelope are determined. The intersected point positions are specified in terms of X and Y coordinates. They are represented as reference numbers 713, 715, 717 and 719 respectively in FIG. 7. The program then rotates the intersected points by the determined heading mean of the subset of road segments. To accomplish the rotation, the map matching computer 413 executes the following equations for each intersected point 713, 715, 717 and 719.

EQUATIONS 2.3

$X' = X \cdot \cos \phi - Y \cdot \sin \phi$ $Y' = X \cdot \sin \phi + Y \cdot \cos \phi$ where:

X = the X coordinate of the intersected point before rotation

Y = the Y coordinate of the intersected point before rotation

X' = the X coordinate of the intersected point after rotation

Y' = the Y coordinate of the intersected point after rotation

FIG. 8 shows a graphical representation of the result of the rotation steps. Intersected point 713 has been rotated to 713', intersected point 715 has been rotated to 715', intersected point 717 has been rotated to 717' and intersected point 719 has been rotated to 719'. Also, the ellipse 707' has been rotated and becomes 707''. Note that reference numbers 703 representing the original Y axis and 700 representing the original X axis are shown to illustrate the orientation of the rotated points resulting from the rotation operation.

Next, the position envelope is aligned, or centered on the determined center, or mean position of the pair of outermost road segments, and bounded within a predetermined fixed area surrounding the outermost pair road segments. This bounding step includes the adjustment of the position envelope limited to the road segment width and the map error, or uncertainty. One-half of each of these uncertainties are added to each side of the position envelope when it is fitted to the outermost pair road segments. This step provides a corrected position envelope and optimizes the position uncertainty area corresponding to the vehicle's position. Bounding, or thereby optimizing, may either be in the form of an increasing or decreasing position envelope area depending on the road segment topology and the geometry of the position envelope.

First, an approximation of the position envelope is constructed as a rectangle 805, bounded by the smallest X value of point 713′, the largest X value of point 717′, the smallest Y value of point 715′ and the largest Y value of point 713′.

Next, the center coordinates of the rotated center point 807 of this rectangle 805 are determined. Execution of the following equations, on the map-matching computer 413, support this determination.

EQUATIONS 4, 5

$$X_{n-center} = X_{smallest} + \frac{(X_{largest} - X_{smallest})}{2}$$

$$Y_{n-center} = Y_{smallest} + \frac{(Y_{largest} - Y_{smallest})}{2}$$

Graphically reference number 807 shows the determined $X_{n-center}$ and $Y_{n-center}$. Now, the rectangle can be represented by two variables related to the newly determined center point 807. These variables, semi-major axis (a) 811 and a semi-minor axis (b) 813 are determined as follows.

EQUATIONS 6,7

$a = (Y \text{ largest} - Y \text{ smallest})/2$ $b = (X \text{ largest} - X \text{ smallest})/2$ After this determination, the program reverses the rotation process to reorient the rectangle 805 and the center point 807 to the original heading, or azimuth, by executing the following equations 8 and 9. The result is shown graphically in FIG. 9 as reference number 805′ and 807′ respectively.

EQUATIONS 8,9

$X = X' \cdot \cos \phi + Y' \cdot \sin \phi$ $Y = Y' \cdot \cos \phi - X' \cdot \sin \phi$ The point 807′ is positioned at the determined center position between the outermost pair of road segments, in this case the two road segments 701 and 711, within the subset of the probable road segments.

Diverging for a moment, FIGS. 7, 8, and 9 show only two road segments 701 and 711. The method, described in the preferred embodiment, can accommodate more probable road segments within the position envelope 707′. In any case, the outermost pair of road segments are used in the computations described earlier. These will have the minimum and maximum headings, otherwise the road segments would cross, forming an intersection.

In some cases it may be desirable not to align the position envelope corresponding to the center of the pair of outermost road segments. One case is where the pair of outermost probable road segments have different areas of uncertainty associated with the respective road segments. In this case an off-center alignment may be more effective.

Returning to the method at hand, the known uncertainty from the systematic errors, such as road width and map position uncertainty are added to the semi-minor axis (b) 813, in effect fitting, or bounding the rectangular position envelope. Then a new ellipse is computed to form the final, corrected, position envelope 707′′′. Note that the semi-major axis (a) 811 represents a distance traversed error that is not corrected here. The semi-minor axis (b) 813′ bounding is done as follows.

EQUATION 10

$b' = b + (\text{road width} + \text{map uncertainty})/2$

This completes the optimization of the position envelope.

Of course, many different mathematical models can be used to effect this centering, and bounding operation. In the preferred embodiment the elliptical math model, is applied because of its simplicity regarding this type of operation. Those skilled in the relevant art will recognize other mathematical models that substantially accomplish the same result.

Note that only a correction due to position uncertainty, associated with heading errors was made. The error associated with distance traversed uncertainty can be easily clipped, corrected, or fitted when the vehicle maneuvers through a significant heading change associated with a particular position on the map. If this happens then this distance traversed uncertainty can be corrected by map-matching.

Comparing FIG. 8 to FIG. 3, the position envelope 805′ corresponds to the position envelope 307′′′′ including the bounded uncertainty area corresponding to reference numbers 313 and 315. In FIG. 9 the uncertainty area is shown by reference numbers 901 and 903.

In conclusion, an improved accuracy vehicle positioning method for optimizing a position envelope's size, corresponding to an increasing degree of uncertainty caused by sensors associated with a vehicle navigation system while an ambiguous road segment topology is present has been detailed. It overcomes the deficiencies of prior art schemes, thus providing a more robust model for vehicle position when the vehicle is traversing proximate an ambiguous road topology.

What is claimed is:

1. A vehicle position uncertainty area correction method comprising the steps of:
   providing a map database comprising more than one substantially parallel connected road segment;
   receiving position measurements from a positioning system of the vehicle;
   providing an initial position envelope that varies in size dependent on the received position measurements;
   exacting the more than one substantially parallel connected road segment from the map database dependent on the initial position envelope;
   determining an outermost pair of road segments from the extracted more than one substantially parallel connected road segment; and
   providing a corrected position envelope, derived from said initial position envelope, said corrected position envelope bounded within a fixed area surrounding the outermost pair of road segments.

2. A method in accordance with claim 1 wherein said outermost pair of road segments comprise road segments that are substantially parallel within a predetermined criteria.

3. A method in accordance with claim 2 wherein said outermost pair of road segments comprise connected road segments.

4. A method in accordance with claim 1 wherein said fixed area corresponds to a map database position uncertainty associated with the map database, wherein said map database position uncertainty is independent of said received position measurements.

5. A method in accordance with claim 4 wherein said predetermined fixed area corresponds to a position uncertainty associated with a road width of at least one of said outermost pair of road segments.

6. A vehicle position uncertainty area correction method comprising the steps of:
 providing a map database comprising more than one substantially parallel connected road segment;
 receiving position and orientation measurements from a positioning system of the vehicle;
 providing a position envelope defining a position and an orientation of a vehicle dependent on the received-position and orientation measurements;
 providing an outermost pair of substantially parallel connected road segments extracted from the map database, wherein the pair of substantially parallel connected road segments is positioned within boundaries delimited by said position envelope; and
 providing a corrected position envelope by aligning outer boundaries of said position envelope in accordance with said outermost pair of connected road segments, and bounding said position envelope within a fixed area positioned surrounding said outermost pair of connected road segments.

7. A method in accordance with claim 6 wherein said step of providing an outermost pair of substantially parallel connected road segments comprises the steps of:
 providing a predetermined heading variance criteria; and
 providing said outermost pair of substantially parallel connected road segments having headings corresponding within said heading variance criteria.

8. A method in accordance with claim 6 wherein said step of providing a corrected position envelope by aligning comprises a step of centering the outer boundaries of said position envelope to an average heading of said outermost pair of connected road segments.

9. A method in accordance with claim 8 wherein said fixed area corresponds to a map database position uncertainty associated with the map database, wherein said map database position uncertainty is independent of a position of said vehicle and is associated with a road width of at least one of said outermost pair of connected road segments.

10. A vehicle position uncertainty area correction method comprising the steps of:
 providing a map database comprising more than one substantially parallel connected road segment;
 receiving a position and an orientation measurement from a positioning system of the vehicle;
 providing a position envelope in accordance with a position and an orientation of a vehicle dependent on the received position measurement;
 providing a set of road segments, extracted from the map database wherein the set of road segments is positioned within boundaries delimited by said position envelope;
 providing a subset of connected road segments extracted from said set of road segments in accordance with the received orientation measurement;
 determining a center heading vector of an outermost pair of connected road segments within said subset of connected road segments; and
 providing a corrected position envelope by bounding said position envelope within a predetermined fixed area surrounding said outermost pair of connected road segments centered on said center heading vector of said outermost pair of road segments.

11. A method in accordance with claim 10 wherein said fixed area corresponds to a position uncertainty associated with the map database, wherein said position uncertainty is independent of said received position and orientation measurements.

12. A method in accordance with claim 1 1 wherein said step of providing a subset of connected road segments in accordance with the received orientation measurement comprises the step of:
 comparing the received a orientation measurement with a heading of each road segment within said set of road segments and providing said subset of connected road segments corresponding to a predetermined heading variance.

13. A method in accordance with claim 11 wherein said subset of connected road segments comprise road segments that are substantially parallel within a predetermined criteria.

14. A vehicle position uncertainty area correction apparatus comprising:
 a map database comprising more than one substantially parallel connected mad segment;
 means for receiving position measurements from a positioning system of the vehicle;
 means for providing an initial position envelope that varies in size dependent on the received position measurements;
 means for extracting the more than one substantially parallel connected road segment from the map database dependent on the initial position envelope;
 means for determining an outermost pair of road segments from the extracted more than one substantially parallel connected road segment; and
 means for providing a corrected position envelope, derived from said initial position envelope, said corrected position envelope bounded within a fixed area surrounding the outermost pair of road segments.

15. An apparatus in accordance with claim 14 wherein said outermost pair of road segments comprise road segments that are substantially parallel within a predetermined criteria.

16. An apparatus in accordance with claim 15 wherein said outermost pair of road segments comprise connected road segments.

17. An apparatus in accordance with claim 16 wherein said fixed area corresponds to a position uncertainty associated with the map database, wherein said position uncertainty is independent of said received position measurements.

18. An apparatus in accordance with claim 17 wherein said predetermined fixed area corresponds to a position uncertainty associated with a road width of at least one of said outermost pair of road segments.

19. A vehicle position uncertainty area correction apparatus comprising:
- a map database comprising more than one substantially parallel connected mad segment;
- means for receiving position measurements from a positioning system of the vehicle;
- means for providing an initial position envelope that varies in size dependent on the received position measurements;
- means for extracting the more than one substantially parallel connected road segment from the map database dependent on the initial position envelope;
- means for determining an outermost pair of road segments from the extracted more than one substantially parallel connected road segment; and
- means for providing a corrected position envelope by aligning outer boundaries of said corrected position envelope in accordance with said more than one substantially parallel connected road segment, and bounding said corrected position envelope within a fixed area positioned surrounding said more than one substantially parallel connected road segment.

20. An apparatus in accordance with claim 19 wherein said means for providing an outermost pair of connected road segments comprises:
- means for providing a predetermined heading variance criteria; and
- means for providing an outermost pair of connected road segments having headings corresponding within said heading variance criteria.

21. An apparatus in accordance with claim 20 wherein said means for aligning comprises means for centering the outer boundaries of said position envelope.

22. An apparatus in accordance with claim 21 wherein said fixed area corresponds to a position uncertainty associated with the map database, wherein said position uncertainty is independent of said received position measurements, and is associated with a road width of at least one of said outermost pair of connected road segments.

23. An apparatus in accordance with claim 22 wherein said outermost pair of connected road segments comprise road segments that are substantially parallel within a predetermined criteria.

* * * * *

UNITED STATES PATENT AND TRADEMARK OFFICE
CERTIFICATE OF CORRECTION

PATENT NO. : 5,436,840
DATED : July 25, 1995
INVENTOR(S) : Lam et al.

It is certified that error appears in the above-indentified patent and that said Letters Patent is hereby corrected as shown below:

Col. 10, line 57 "exacting" should be --extracting--

Col. 11, line 23 "received-position" should be --received position--

Col. 12, line 36 "mad" should be --road--

Col. 13, line 5 "mad" should be --road--

Signed and Sealed this

Seventh Day of November, 1995

Attest:

BRUCE LEHMAN

Attesting Officer

Commissioner of Patents and Trademarks